Feb. 10, 1970  G. E. SANDAHL ET AL  3,494,405
SCREEN MOUNTING FOR PROJECTED PICTURES
Filed July 15, 1968  2 Sheets-Sheet 1
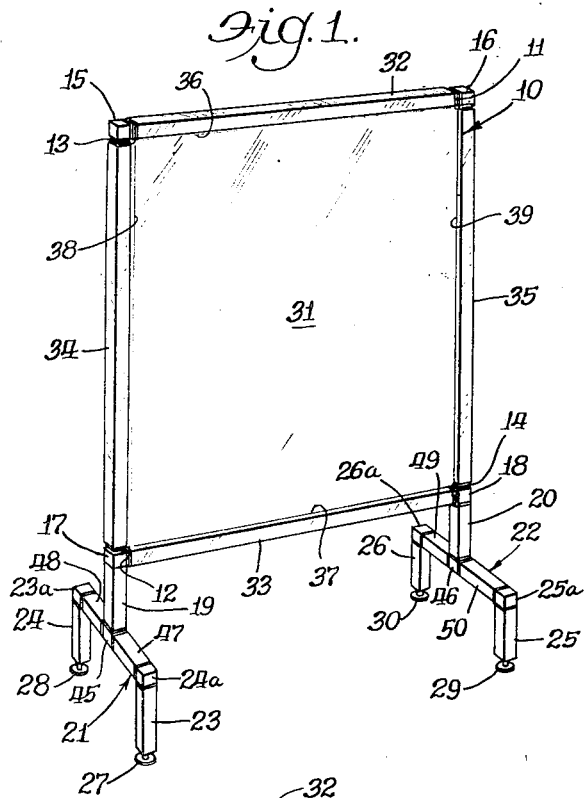
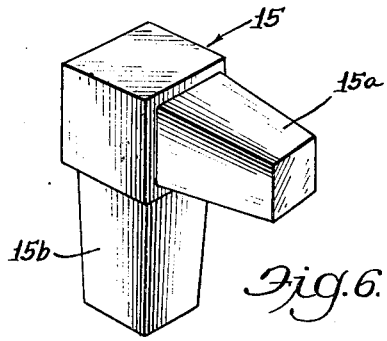
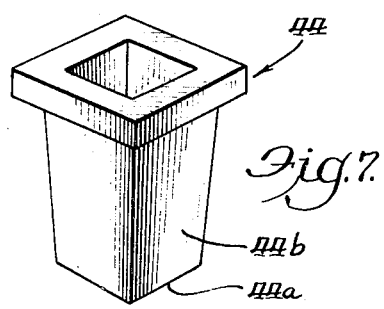
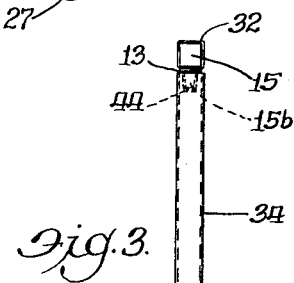
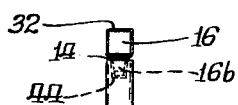
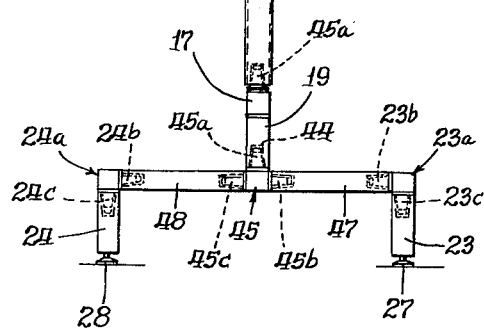
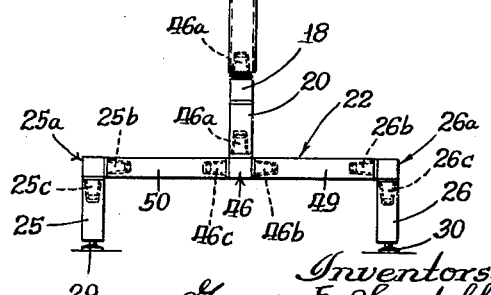
Inventors:
George E. Sandahl
Edward J. Bartelmas
By Snow and Benno
Attys.

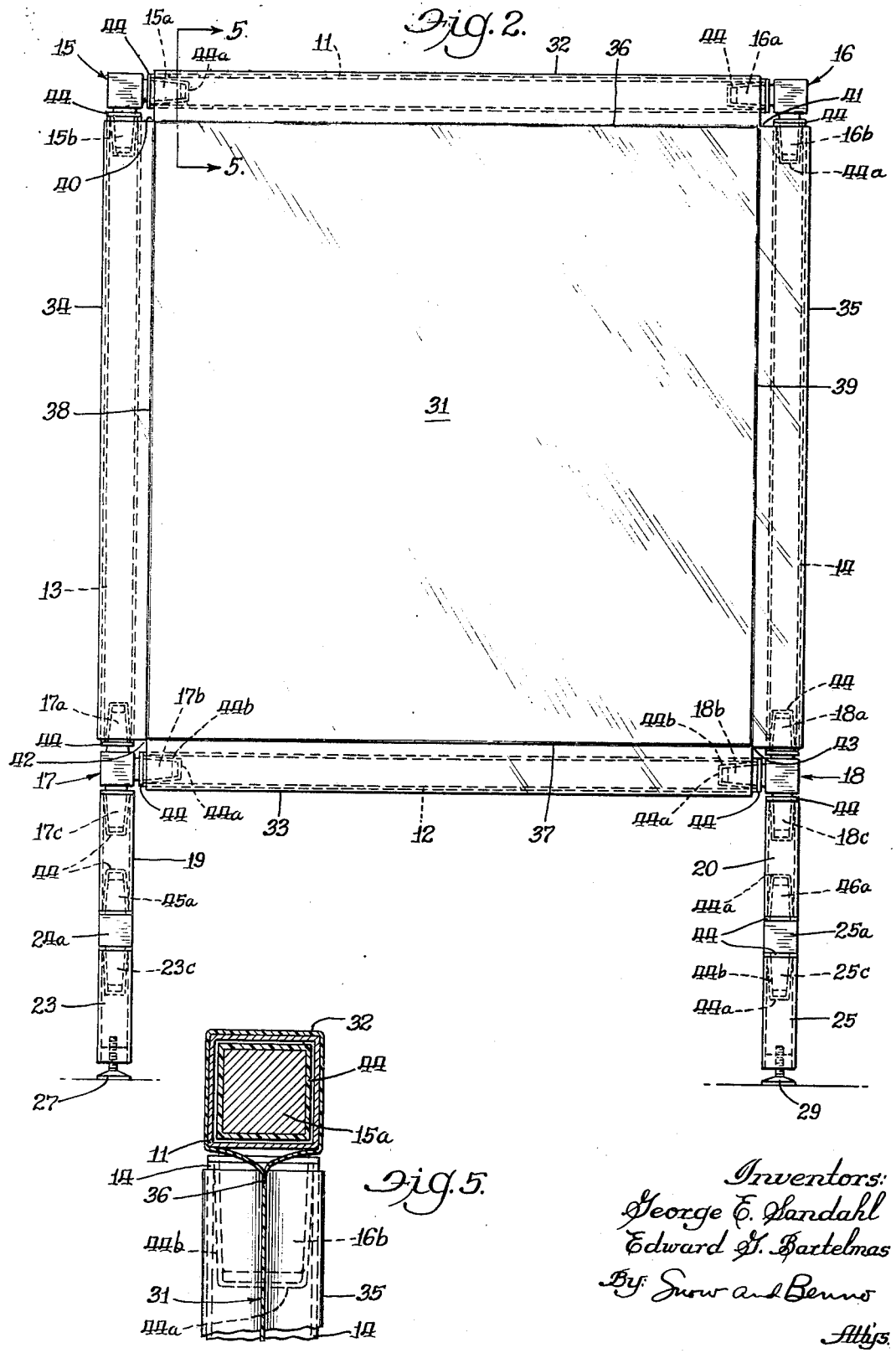

3,494,405
SCREEN MOUNTING FOR PROJECTED PICTURES
George E. Sandahl, Waukegan, and Edward G. Bartelmas, Palatine, Ill., assignors to Radiant Corporation, a corporation of Delaware
Filed July 15, 1968, Ser. No. 744,906
Int. Cl. A47g 5/00
U.S. Cl. 160—24                    7 Claims

ABSTRACT OF THE DISCLOSURE

A mounting for a flexible, somewhat stretchable material to be used as a viewing screen for projected pictures. The rectangular screen having sleeves formed along each of its sides with notches adjacent each end is held uniformly taut by a four sided rigid frame, each side of which has one of the screen sleeves slid thereover.

---

This invention relates to a new and improved screen mounting for projected pictures.

A principal object of the present invention is to provide a novel screen mounting for projected pictures in which the screen is rigidly held taut around its perimeter.

An important object of this invention is to provide a flexible screen of a plastic material, such as polyethylene or vinyl, which can have its surface roughened or coated to simulate a ground glass and which is mounted in a novel manner on a rigid frame and stretched taut throughout its surface, whereby pictures projected thereon may be viewed with clarity.

Another important object of this invention is to provide novel means for stretching a flexible screen material on a rigid frame for either rear or front projection.

Still another important object of this invention is the novel construction of a flexible and stretchable picture viewing screen with integral sleeves formed along each marginal side edge thereof with cut-outs or notches at each adjoining corner to permit sliding of the sleeves over the members comprising a rigid frame.

Other and further important objects and advantages of the invention will become apparent from the disclosures in the accompanying drawings and the following specification.

In the drawings:

FIGURE 1 is a perspective view of the screen mounting for projected pictures of this invention.

FIGURE 2 is a front elevational view of the device of FIGURE 1.

FIGURE 3 is one end elevational view of the device of FIGURES 1 and 2.

FIGURE 4 is the other end elevational view of the device of FIGURES 1 and 2.

FIGURE 5 is a sectional view of a portion of the device taken on the line 5—5 of FIGURE 2 and showing the detail of attachment of the flexible screen to the rigid frame.

FIGURE 6 is a perspective view of the corner members employed in the frame of this invention.

FIGURE 7 is a perspective view detail of a plastic cup employed in the assembly of the frame of this invention.

As shown in the drawings:

The reference numeral 10 indicates generally a rigid rectangular frame which may be made primarily of steel The frame consists of a top rigid tubular member 11, a generally parallel spaced apart bottom rigid tubular member 12, and spaced apart vertical side rigid tubular members 13 and 14 which join the top and bottom members 11 and 12. The rigid rectangular frame is provided with generally square shaped corner members 15, 16, 17, and 18.

The vertical and generally parallel side members 13 and 14 are provided with downward tubular extensions 19 and 20 respectively. The depending member 19 abuts and is affixed to substantially the center of a fore and aft extending tubular member 21. Similarly the depending member 20 has its lower end abutting and affixed to substantially the center of a fore and aft extending tubular frame member 22. The frame members 21 and 22 are preferably disposed parallel to one another. The frame member 21 is provided with downwardly extending vertical tubular legs 23 and 24 joined to the front and rear respectively by corner members 23a and 24a. Similarly the frame member 22 is provided with downwardly extending vertical tubular legs 25 and 26 joined to the front and rear by corner members 25a and 26a. Floor or other surface engaging feet or pads in the form of vertically adjustable screws 27, 28, 29 and 30 are provided in the lower ends of each of the legs 23, 24, 25, and 26.

The rigid frame defined has a rectangular portion 10 to receive a picture viewing screen and the entire frame is surface supported with the four spaced apart legs 23, 24, 25 and 26 each of which has a levelling screw pad 27, 28, 29, and 30.

A rectangularly shaped flexible plastic picture viewing screen 31 is carried on and in the rigid rectangular frame 10. The plastic screen may be any one of numerous plastic materials which have the desired characteristics of being capable of slight stretching in both horizontal and vertical directions, and being capable of receiving either a surface roughening or a coating which gives it a translucent quality in the nature of a ground glass. The roughening or coating gives proper light dispersion on the screen in the projection of pictures on the rear side thereof or for front viewing if that is desired. Two acceptable plastic materials are vinyl and polyethylene.

As shown in the drawings the plastic screen 31 is provided with integral sleeves along each of its four sides. The sleeves are made by turning a uniform marginal edge back over the surface of the screen, as in a hem, and thereafter a thin edge thereof is attached by any acceptable means along its full length to the surface of the screen thereby forming the integral sleeves. The top sleeve is designated by the numeral 32, the bottom sleeve by the numeral 33, and the laterally spaced apart side sleeves 34 and 35. The means for attaching could be by a cement, an adhesive, a heat seal, a stitching, or some other attaching means and still provide the desired continuous attaching which creates the integral sleeves. The top seam 36 defines the top sleeve 32, the bottom seam 37 defines the bottom sleeve 33, and the seams 38 and 39 define the sleeves 34 and 35 respectively.

As best shown in FIGURES 1 and 2 the screen 31 is provided with square notches 40, 41, 42 and 43 at each of the four corners thereof. These notches leave the frame corners 15, 16, 17 and 18 exposed and simultaneously permit the perimeter tubular frame members to be slid through the sleeve members of the screen without conflict at the junctures of the frame members.

The corner members 15, 16, 17, 18, 23a, 24a, 25a, and 26a are provided with right angularly disposed tapered projection members. The specific construction of the corners has been shown in FIGURE 5 wherein the corner has been depicted separately. The corner 15 in addition to having its main square or cube portion has a tapered projection 15a and a second tapered projection 15b disposed at right angles thereto. A plastic cup or insert 44 as shown in FIGURE 6 is equipped with a bottom 44a and tapered side walls 44b which conform generally to the size and shape of the tapered projections of the corner members of FIGURE 5.

In the assembly of the device it will be seen that a plastic cup is inserted into the open ends of the tubular frame members whereafter the tapered projection of the corner member is inserted into the cup and telescopes into the rigid tube member. The purpose of the plastic cup or insert is to facilitate ease of insertion of the telescoping projections of the corner members and to accommodate any irregularities of the tube and corner members to thereby result in good looking corner joints.

As shown in FIGURE 2 a plastic sleeve 44 has been inserted in the end of the top tube 11 and the tapered projection 15a has been firmly tapped into the cup and thus also the rigid tube 11. A similar plastic cup 44 has been inserted into the top of the side tubular member 13 to snugly receive the right angularly disposed tapered projection 15b of the corner member 15. It should of course be understood that the tubular frame members 11, 12, 13, and 14 have been preliminarily inserted through the sleeves or side pockets of the somewhat stretchable plastic picture viewing screen 31. A similar assembly occurs at corner 16 wherein a plastic cup 44 is inserted in the other end of the top tubular member 11 whereafter a tapered projection 16a of the corner 16 is driven into telescoped position within the tube 11, but with the plastic cup 44 acting as an intermediate sleeve member. The downwardly extending tapered projection 16b of the corner 16 is driven into a plastic cup 44 which has been placed in the top of the side tubular member 14.

The corners 17 and 18 include all of the features of corners 15 and 16 and in addition are provided with a third tapered projection. As further shown in FIGURE 2 the corner 17 has its tapered projection 17a telescoping the lower end of the side tubular frame member 13. As in all of the corners a plastic cup 44 lines the telescoped joint. The tapered projection 17b with a plastic cup 44 thereover is pressed into the end of the bottom tubular member 12. The space between the upper frame member 11 and the bottom frame member 12 on the left side thereof as viewed in FIGURE 2 is held in fixedly spaced apart position by the left side frame member with the corners 15 and 17 assembled as described. The corner 17 also has a tapered projection 17c which extends downwardly in a direction opposite to the projection 17a and in alignment therewith. A plastic cup 44 is mounted over the projection 17c and the sleeved projection is inserted into the top of the tubular frame member 19.

The corner 18 is usually the last member to be assembled into the frame at which point the plastic screen is stretched or drawn tautly to make a smooth flat screen to receive picture projection. The corner 18 is provided with an upwardly extending tapered projection 18a which has a plastic cap 44 mounted thereover and then is inserted into the lower end of the side tubular frame member 14. A second tapered projection 18b extends generally horizontally from the corner 18 and with a plastic cap 44 mounted thereover is inserted into the right hand open end of the tubular frame member 12. The assembly of this last corner member requires some stretching of the picture receiving screen 31 but because of the resilient character of the material it is possible to make this corner insertion and still maintain a taut screen. The corner 18 is also provided with a downwardly extending tapered projection 18c which is disposed opposite the projection 18a but in alignment therewith. The tapered projection 18c with a plastic cup 44 positioned thereover is inserted into the top of the vertically disposed frame member 20.

The corner members are in fact connecting elements utilized to join two or more tubular frame members together in a desired angular relationship. The lower ends of the tubular members 19 and 20, although not involving external corners, require connector elements 45 and 46 respectively. As best shown in FIGURE 3 the connector element 45 has an upwardly extending tapered projection 45a which is capped with a plastic member 44 and inserted into the lower open end of the tubular member 19. The connector member 45 includes oppositely disposed tapered projections 45b and 45c which are in general horizontal alignment. These projections with plastic caps 44 mounted thereover are inserted into tubular portions 47 and 48 of the fore and aft disposed frame member 21. Similarly the connector element 46 has an upwardly extending tapered projection 46a which with a plastic cap 44 thereover is inserted into the lower end of the tubular frame member 20. The connector 46 is also equipped with oppositely disposed laterally extending tapered projections 46b and 46c which with plastic caps 44 mounted thereover are inserted into the open ends of tubular portions 49 and 50 of the frame member 22.

As best shown in FIGURE 3 the corner or connecting member 23a has a laterally extending tapered projection 23b which, with a plastic cup 44 thereover, is inserted into the forwardly opening end of the tubular portion 47 of the frame member 21. A second right angularly disposed tapered projection 23c with a plastic cup 44 mounted thereon is inserted into the top of the tubular leg member 23. The corner member 24a is similar in its function to that of the corner member 23a and is equipped with a horizontally extending tapered projection 24b which with a plastic cup 44 thereover is inserted into the rearward end of the tubular portion 48 of the frame member 21. A downwardly extending tapered projection 24c with a plastic cup 44 thereover is inserted into the top of the tubular leg member 24.

As best shown in FIGURE 4 the corner member 25a has an inwardly extending tapered projection 25b which with a plastic cap 44 thereover is inserted into the tubular portion 49 of the frame member 22. A downwardly extending tapered projection 25c from the corner 25a has a plastic cap 44 mounted thereon and is inserted into the top of the leg member 25. Similarly the corner member 26a is provided with a forwardly extending tapered projection 26b having a plastic cap 44 mounted thereon for projection into the rearward end of the tubular portion 50 of the frame 22. A downwardly extending tapered projection 26c having a plastic cap 44 thereon is inserted into the top of the leg member 26.

The construction of the frame with the tapered corner or connector projections telescoping into the tubular members provides a rigid unitary frame when assembled in the manner described and as shown in the drawings. Although the tubing depicted is square in cross section, it should be understood that round or other polygonally shaped tubing would function equally as well and would act to provide a rigid frame for the plastic screen 31 of this invention.

It should also be apparent that any means of separation of the rectangular frame members may be employed to permit insertion through the screen sleeves. The corners or connecting members with their tapered projections are representative of one successful way of accomplishing screen assembly.

We are aware that numerous details of construction may be varied throughout a wide range without departing from the principles disclosed herein and we therefore do not propose limiting the patent granted hereon otherwise than as necessitated by the appended claims.

What is claimed is:

1. A projected picture viewing screen comprising a generally rectangularly shaped rigid frame having four rigid side members, a generally rectangularly shaped flexible plastic material screen capable of being stretched, integral sleeves formed along each of the four sides of the plastic material, said plastic material and its integral sleeves having notches at each corner thereof, said plastic material assembled on said rigid frame in such manner that a rigid side member passes through each of the integral sleeves thereby stretching the plastic material taut and smooth throughout its full surface, and the surface of said plastic material treated for the proper reception of projected pictures.

2. A device as set forth in claim 1 in which each of said four rigid side members comprise a tubular member, and the rigid frame further including corner connecting members, whereby the assembly of the screen on the rigid frame is accomplished by sliding a tubular member through the integral sleeves of the screen and thereafter applying the corner connecting members to the tubular frame members to hold them in a generally rectangular shape.

3. A device as set forth in claim 2 in which the corner connecting members have angularly disposed tapered projections for telescoping engagement with the ends of the tubular frame members.

4. A device as set forth in claim 3 in which the junctures between the tapered projections and the tubular frame members have intermediately disposed plastic cup members.

5. A device as set forth in claim 1 in which said rectangularly shaped rigid frame is equipped with a surface supporting means.

6. A device as set forth in claim 5 in which said surface supporting means comprises downward extensions of the side members of said rigid rectangular frame, fore and aft extending members on the lower ends of said downward extensions, and surface engaging legs on the front and rear of said fore and aft extending members.

7. A device as set forth in claim 1 in which said integral sleeves of the screen are formed by a turning back of the edges of the screen and attaching the turned back edges to the surface of the screen.

References Cited

UNITED STATES PATENTS

| | | | |
|---|---|---|---|
| 1,250,376 | 12/1917 | Starbuck et al. | 160—378 X |
| 2,055,862 | 9/1936 | Friedman | 160—24 |
| 3,002,557 | 10/1961 | Roth et al. | 160—378 X |
| 3,407,561 | 10/1968 | Peacock | 52—656 |

J. KARL BELL, Primary Examiner

U.S. Cl. X.R.

160—378